2,713,571

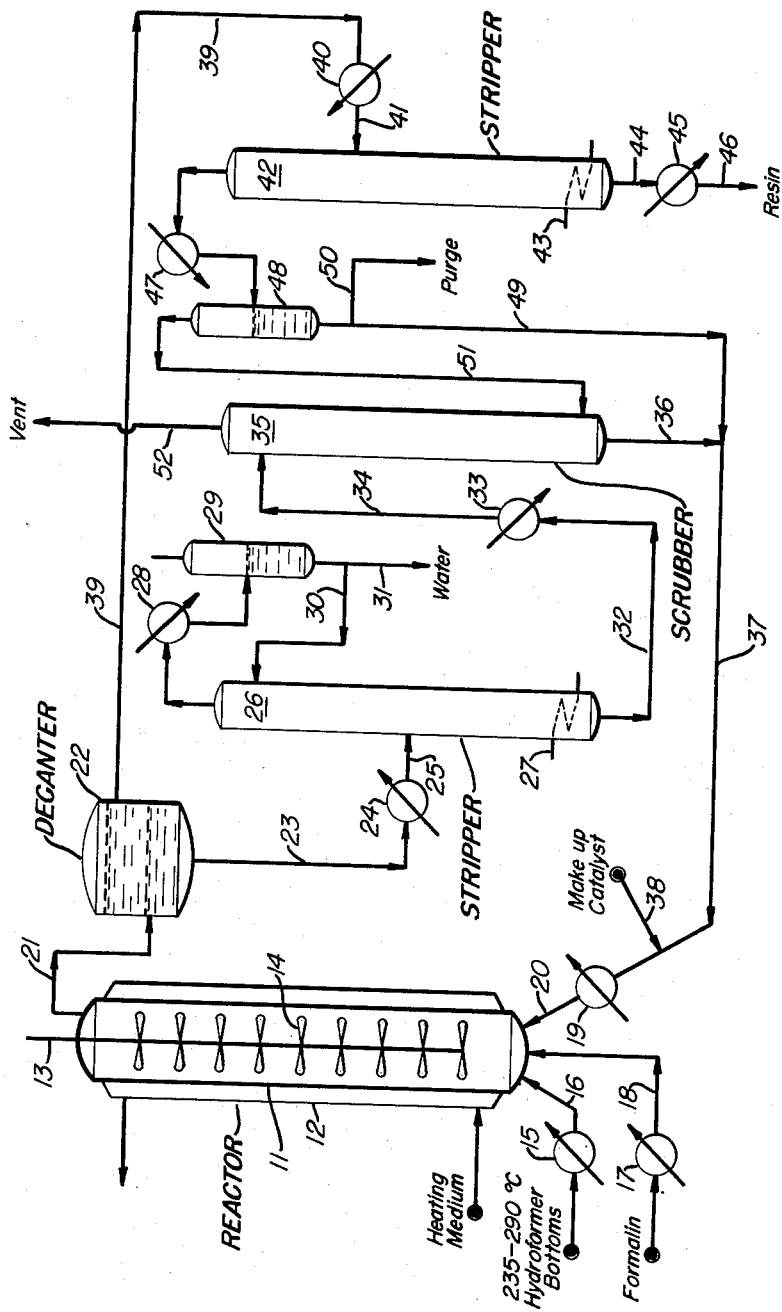

MAKING FORMOLITE RESINS USING AQUEOUS SOLUTION OF BORON FLUORIDE

Leon B. Gordon, Texas City, and Joe T. Kelly, Galveston, Tex., assignors, by mesne assignments, to Pan American Refining Corporation, Texas City, Tex., a corporation of Texas Application October 13, 1953, Serial No. 385,832

8 Claims. (Cl. 260—67)

This invention relates broadly to resinous materials. More particularly, it relates to a process and to a catalyst for the production of resinous materials by the condensation of aromatic hydrocarbons with formaldehyde.

It is well known that certain types of aromatic hydrocarbons can be induced to react with formaldehyde to produce materials of high molecular weight having useful properties in a number of applications. Such materials include the so-called "formolite" resins, and may be prepared, for example, as described by Thompson in U. S. Patent 2,382,184 (August 14, 1945), by Badertscher and Bishop in U. S. Patent 2,397,398 (March 26, 1946), and by May and Lee in U. S. Patent 2,597,159 (May 20, 1952). All of the prior-art processes, however, employ catalysts which are difficult and expensive to recover and recycle; and all of the said processes require the use of anhydrous formaldehyde for best results. For these and other reasons, efforts in the past to commercialize the prior-art processes have had little or no success.

We have now discovered a new and improved catalytic process for the condensation of aromatic hydrocarbons with formaldehyde. Our new process employs as the catalyst a hydrate of boron trifluoride, suitably prepared by dissolving boron trifluoride in water to a concentration between about 10 and 60 percent by weight of $BF_3$, preferably between about 20 and 45 percent. The resulting solution is highly effective in the production of resinous materials of high quality from the low-cost aqueous formalin of commerce, and is readily recovered and recycled by simple means.

One object of our invention is to effect an improvement in the catalytic condensation of aromatic hydrocarbons with formaldehyde. Another object is to provide a novel catalyst for the production of formolite resins. A further object is to provide a new catalytic process for the manufacture of resinous materials from aromatic hydrocarbons and formaldehyde. Another object is to produce resins of improved properties from catalytic reformer bottoms. Another object is to provide a method for preparing formolite resins from aqueous formaldehyde. Another object is to provide a condensation catalyst capable of being repeatedly recovered and recycled. These and other objects of our invention will be apparent from the following description thereof.

Our catalyst is conveniently prepared by bubbling gaseous boron trifluoride into water at ordinary temperatures until the desired concentration is reached, or by dissolving an excess of boron trifluoride in water and thereafter diluting to the desired concentration. The resulting liquid is ordinarily water-white, and is somewhat viscous at the higher concentrations. The concentration of $BF_3$ in the completed catalytic mixture should be below about 60 percent by weight in order to avoid emulsion formation during the formolite condensation, and we prefer to employ catalyst solutions having an initial $BF_3$ concentration between about 20 and 45 percent by weight. Our catalyst is highly effective in producing resins of good quality from aromatic hydrocarbons and aqueous formaldehyde such as the aqueous formalin of commerce. The water contained in the formalin does not impair the activity of the catalyst; and after the condensation has been completed, the diluted catalyst phase is readily reconcentrated to the original level by a simple stripping operation without loss of $BF_3$ in the water taken overhead. Thus, the catalyst is readily recovered and recycled.

In practising our invention, an aromatic hydrocarbon having at least one, and preferably at least two, unsubstituted nuclear carbon atoms is heated with formaldehyde or an aqueous solution or polymer thereof at a temperature between about 10 and 200° C., preferably between about 60 and 130° C., for a total reaction time between about 1 and 20 hours, preferably between about 5 and 10 hours, varying inversely according to the temperature employed. The condensation is ordinarily carried out at atmospheric or autogenous pressure, although higher or lower pressures may be employed, for example, between about 5 and 50 pounds per square inch absolute. The molar ratio of formaldehyde to aromatic hydrocarbon should be between about 0.5 and 5, a ratio between about 1 and 2 being preferred. The weight ratio of catalyst to aromatic hydrocarbon feed stock should be between about 0.05 and 5, preferably between about 0.1 and 1, calculated as anhydrous $BF_3$. Formaldehyde may be employed in any of the available forms, such as the vapor, aqueous solutions such as commercial formalin, solutions in methanol or other organic solvents, or polymers such as paraformaldehyde which are capable of yielding monomeric formaldehyde under the reaction conditions. We prefer to use commercial formalin having an HCHO concentration around 30 to 40 percent by weight. The reaction mixture may include an additional organic liquid if desired of suitable specific gravity and interfacial tension to repress emulsion formation. Among such liquids are petroleum naphthas, isooctane, decane, cetane, and other aliphatic hydrocarbons, cyclohexane, methylcyclohexane, and other naphthenes, and in some cases benzene, toluene, and the like.

After the condensation reaction has reached the desired degree of completion, the two-phase reaction product is stratified and the phases are separately withdrawn. The organic phase, comprising any added solvent, unreacted aromatic hydrocarbons, inert hydrocarbon-soluble materials, and the condensation product, may be subjected to a water wash if desired to improve the color of the product resin and/or to a treatment with sulfuric acid or with clay, charcoal, or other adsorbent solid. Thereafter it is subjected to a stripping operation to remove the lower-boiling constituents, leaving the desired resin behind as a bottoms product. The overhead product may suitably be recycled, a portion thereof being withdrawn from time to time to prevent any excessive buildup of inert materials in the system. The aqueous phase, containing $BF_3$ catalyst and the water initially introduced therewith, plus the water of condensation and any water included with the formaldehyde, is conveniently concentrated in a stripping still, where the incremental water is distilled overhead and withdrawn. This operation, we have found, is readily carried out without loss of any detectable quantity of boron trifluoride in the distillate. The reconcentrated aqueous boron trifluoride is suitable for direct recycle to the condensation zone.

Our process is suitable for the treatment of aromatic hydrocarbons containing one or more unsubstituted nuclear carbon atoms. Aromatic hydrocarbons containing a single unsubstituted nuclear carbon atom may be employed when it is desired to condense two moles of aromatic hydrocarbon with one mole of formaldehyde, but the aromatic hydrocarbon should have at least two unsubstituted nuclear carbon atoms if multiple condensations of formaldehyde and aromatic hydrocarbon are desired. Our changing stocks preferably boil between about 100 and 300° C., and may contain toluene, xylenes, mixed xylenes, cumene, ethyltoluenes, ethylxylenes, mesitylene, methylnaphthalenes, methylpropylnaphthalenes, butylnaphthalenes, methylbutylnaphthalenes, tetralin, methyltetralins, anthracene, methylanthracenes, phenanthrene, methylphenanthrenes, and the like. A desirable and readily available charging stock is hydroformer bottoms or a fraction thereof, prepared as described, for example, by Marschner in U. S. Patent 2,335,596 (November 30, 1943) and by Wadsworth and Lee in U. S. Patent 2,462,792 (February 22, 1949). Especially useful is a heart fraction of total hydroformer bottoms boiling between about 235 and 290° C. and containing principally mono- and di-methylnaphthalenes with 10 to 20 volume percent of monocyclic aromatics and tetralins, less than about 10 volume percent of paraffins and naphthenes, and small proportions of polymethylnaphthalenes. The approximate ratio of dimethyl- to monomethyl-naphthalenes therein is 2. The charging stocks may be subjected to a preliminary purification if desired by treatment with sulfuric acid and/or clay, or by other techniques known in the art for the removal of color bodies, sulfur compounds, oxygenated compounds, or other impurities which might undesirably affect the condensation reaction or the quality of the resinous product.

Our charging stocks may advantageously include one or more co-reactants of various types in order to produce condensation products of modified properties. Among such co-reactants are phenol, substituted phenols such as cresols, xylenols, ortho-tert.-butylphenol, para-tert.-butylphenol; maleic anhydride; reactive aromatic nitrogen compounds such as para-toluenesulfonamide; and the like. The ratio of co-reactants to aromatic hydrocarbons may suitably be up to around 1:1 by volume, but is generally considerably lower, of the order of 0.05:1 to 0.25:1.

The attached drawing illustrates in schematic form a process employing the catalyst of our invention for the condensation of aqueous formalin with a heart fraction of hydroformer bottoms. The process utilizes an elongated reaction vessel 11 equipped with heating jacket 12 and rotary agitator 13 having a multiplicity of vanes 14. Into the bottom of reactor 11 is fed a 235-290° C. fraction of hydroformer bottoms through heater 15 and line 16, and aqueous 40 percent formalin through heater 17 and line 18, the molar ratio of HCHO to aromatic hydrocarbons being between about 1 and 2. Also into the bottom of reactor 11 is introduced a recycle stream of catalyst through heater 19 and line 20, consisting of an aqueous 40 percent solution of boron trifluoride, the quantity thereof being sufficient to produce a weight ratio of $BF_3$ to hydroformer bottoms fraction around 0.25:1. The mixture flows upward through reactor 11, where it is vigorously agitated by vanes 14 and is heated to a temperature around 100° C. by means of a heating medium circulating through jacket 12. Condensing steam is a convenient heating medium, but numerous alternatives will be apparent to those skilled in the art. After an average residence time between about 5 and 10 hours, the reaction mixture emerges from the top of reactor 11 through line 21 into decanter 22, where stratification of an organic and an aqueous phase takes place.

The aqueous phase, comprising substantially all of the boron trifluoride, unreacted formaldehyde, the water originally present in the catalyst stream, the water contained in the aqueous formalin, the water produced by the condensation reaction, and any other minor quantities of water-soluble organic compounds present in the reaction mixture, is led from decanter 22 through line 23, heater 24, and line 25 into an intermediate point of stripper column 26, equipped with reboiler 27. The stripper is operated under conditions to produce a bottoms stream comprising essentially aqueous 40 percent $BF_3$ for recycle. This is accomplished by taking water off overhead together with any low-boiling organic materials. The overhead stream passes through condenser 28 into reflux drum 29, from which a portion is refluxed through line 30 to the top of the column, while the remainder is withdrawn through line 31. Virtually no boron trifluoride appears in the overhead stream from stripper 26.

The bottoms stream from stripper 26, comprising essentially an aqueous 40 percent $BF_3$ solution, flows through line 32, cooler 33, and line 34 into the top of scrubber column 35, where it is used to scrub boron trifluoride from an ascending vapor stream, to be described hereinafter. The aqueous $BF_3$ stream emerges from the bottom of scrubber 35 through line 36 and is recycled through line 37, heater 19, and line 20 to reactor 11. Makeup $BF_3$ or aqueous $BF_3$ is added as required through line 38 to line 37.

The organic phase from decanter 22, comprising essentially resin and unreacted charging stock, is led through line 39, heater 40, and line 41 into an intermediate point of stripper 42, equipped with reboiler 43. Within the stripper, low-boiling materials, including unreacted portions of the charging stock, are removed by the action of reboiler 43, leaving the desired resin, which flows from the bottom of stripper 42 through line 44, cooler 45, and line 46. The overhead stream from stripper 42 emerges through condenser 47 into separator 48. From the separator flows a liquid stream, consisting predominately of unreacted charging-stock components, which is recycled in part through lines 49 and 37, heater 19, and line 20 to reactor 11, while a portion is withdrawn through line 50 to prevent inert materials from accumulating within the process streams. Also from separator 48 flows a gas stream, consisting essentially of low-boiling hydrocarbons and a small proportion of boron trifluoride. This stream is led through line 51 into the bottom of scrubber 35, where the boron trifluoride is removed, and the scrubbed vapor stream emerges overhead through line 52. The overhead stream may be vented, flared, or otherwise used or treated as desired.

The following specific examples will more clearly illustrate our invention:

*Example 1*

A 235-290° C. hydroformer bottoms fraction (300 ml.), aqueous 40 percent formaldehyde (150 ml.) and an aqueous 43 percent $BF_3$ solution (345 g.) were commingled and stirred at 85 to 90° C. for between 6 and 7 hours. The reaction product was allowed to stratify and the layers were separately withdrawn. The product resin was recovered as bottoms from a vacuum distillation of the organic layer. The resin weighed 177 g., corresponding to a 62 weight-percent yield based on the hydroformer-bottoms fraction, and had a Cumar color of 5 and a softening point of 220° F.

*Example 2*

A $BF_3$-hydrate catalyst was prepared by bubbling boron trifluoride into water until the boron trifluoride was no longer absorbed. The resulting solution was water-white and somewhat viscous, and contained 76 percent by weight of $BF_3$. In order to determine its recoverability from a formolite condensation, a portion of the solution was diluted with a large quantity of water (corresponding to the dilution that would be produced by the water of reaction in our process and the water contained in formalin), and was then fractionally distilled through a 10-plate Oldershaw column. An overhead fraction of approximately 25 percent by volume was founded to be virtually pure water, free from boron compounds. Thus, the feasibility of reconcentrating the diluted solution was demonstrated.

A portion (521 g.) of the reconcentrated aqueous solution containing 50 to 60 percent $BF_3$ was used as a catalyst for the reaction of a 235–290° C. fraction of hydroformer bottoms (268 g.) and toluene (130 g.) with aqueous 40 percent formalin (135 g.). The reaction mixture was stirred for 4 hours at about 90° C. and was then allowed to stratify. The aqueous $BF_3$ phase was separated and withdrawn, and the product resin was recovered by direct stripping of the hydrocarbon phase. An 86 percent yield of resin (based on hydroformer bottoms fraction) was obtained. The resin had a softening point of 184° F., a cloud point of 37° C., an iodine number of 4, a Cumar color of 4, and a Gardner color of 17.

In a similar test, aqueous 30 percent aluminum chloride was ineffective for producing resins.

*Example 3*

In another test on the feasibility of recovering and recycling our catalyst, 300 grams of aqueous 42 percent $BF_3$ were mixed with 150 milliliters of 40 percent formalin and stirred for several hours at 80 to 90° C. The solution was diluted thereby with the water initially contained in the formalin. The diluted solution was fractionally distilled at 40 to 50 mm. Hg to a bottoms concentration of 52 percent $BF_3$. Analysis of the aqueous overhead fraction by flame photometry indicated that it was free from $BF_3$. Approximately 96 percent of the original $BF_3$ was accounted for in the bottom fraction, the difference being due to handling losses and analytical errors.

*Example 4*

A mixture of a 235–290° C. heart fraction of hydroformer bottoms (500 g.), commercial aqueous 40 percent formalin (150 ml.), aqueous 65–70 percent $BF_3$ (230 g.) was agitated at 90–100° C., and was converted thereby into an intractable emulsion from which a resinous product could not be readily recovered.

*Example 5*

The following series of runs demonstrate the practicality of recovering, concentrating, and recycling the aqueous $BF_3$ catalyst in the process of our invention. In each of the runs, the designated quantities of hydroformer bottoms (boiling range 235–290° C.), aqueous 40 percent formaldehyde, and aqueous 20–30 percent $BF_3$ were stirred at 85 to 90° C. for 6 to 7 hours. The product layers were separated and the resin was recovered as bottoms from a vacuum distillation of the hydrocarbon layer. The catalyst layer was restored to approximately the original $BF_3$ concentration by vacuum distillation at 40–50 mm. Hg to remove the water added thereto by the polymerization and by the formalin, and was thereafter recycled to the succeeding run. The results were as follows:

| Run No. | Aromatic Fraction, g. | Formalin, ml. | $BF_3$ Solution, g. | Resin Wt., g. | Resin Yield,* wt.-percent | Color, Cumar | Softening Pt., °F. |
|---|---|---|---|---|---|---|---|
| 1 | 500 | 200 | 368 | 97 | 19.5 | 4.5 | 204 |
| 2 | 300 | 150 | Recycle | 120 | 40.0 | 2.5 | 190 |
| 3 | 300 | 150 | ---do--- | 150 | 50.0 | 2.5 | 184 |
| 4 | 300 | 125 | ---do--- | 230 | 76.6 | 8 | 230 |
| 5 | 300 | 100 | ---do--- | 140 | 46.6 | 6 | 221 |

*Based on aromatic (hydroformer bottoms) fraction.

*Example 6*

Another series of runs, carried out as described in Example 5, gave the following results:

| Run No. | Aromatic Fraction, g. | Formalin, ml. | $BF_3$ Solution, g. | Resin Wt., g. | Resin Yield, wt.-percent | Color, Cumar | Softening Pt., °F. |
|---|---|---|---|---|---|---|---|
| 1 | 300 | 150 | 300 | 60 | 20 | 5 | 230 |
| 2 | 300 | 150 | Recycle | 90 | 30 | 4.5 | 225 |
| 3 | 300 | 125 | ---do--- | 60 | 20 | 5 | 155 |
| 4 | 300 | 125 | ---do--- | 95 | 32 | 2.5 | 170 |
| 5 | 300 | 150 | ---do--- | 54 | 18 | 5 | 160 |
| 6 | 300 | 150 | ---do--- | 58 | 19.5 | 4.5 | 196 |
| 7 | 300 | 150 | ---do--- | 41 | 18.0 | 4 | 150 |

The products of our invention are hydrocarbon resins of light color, high softening point, high cloud point, and low iodine number. By a suitable adjustment of reaction conditions, we are able to produce resins having a Cumar color between about 2.5 and 5, a cloud point above about 30° C., a softening point above about 200° F., and an iodine number below about 10. These materials may advantageously be employed as ingredients in varnishes, rubber compositions, floor tiles, insulating compositions, as raw materials in the production of chlorinated insecticides, as extenders for vinyl plastics, and for many other purposes which will be apparent to those skilled in the art. The process of our invention has the important advantages that the catalyst may conveniently be recovered and recycled, low-cost formalin may be used as the source of formaldehyde, neutralization of the resin product phase is rendered unnecessary, and emulsion formation is avoided by appropriate choice of $BF_3$ concentrations within the ranges set forth above.

While we have described our invention with reference to certain specific embodiments thereof, it should be understood that such embodiments are illustrative only and not by way of limitation. Various modifications of our invention and alternative operating procedures and conditions will be apparent from the foregoing description to those skilled in the art.

In accordance with the foregoing description, we claim as our invention:

1. A process which comprises contacting an aromatic hydrocarbon having at least one unsubstituted nuclear carbon atom and formaldehyde with a catalyst consisting essentially of an aqueous solution of boron trifluoride containing between about 10 and 60 percent by weight of $BF_3$ at a temperature between about 10 and 200° C., and separating a resinous organic chemical condensation product thus produced.

2. A process which comprises contacting an aromatic hydrocarbon having at least one unsubstituted nuclear carbon atom and formalin with a catalyst consisting essentially of an aqueous solution of boron trifluoride containing between about 20 and 45 percent by weight of $BF_3$ at a temperature between about 60 and 130° C., and separating a resinous organic chemical condensation product thus produced.

3. A process which comprises reacting a petroleum oil fraction containing aromatic hydrocarbons with formaldehyde in the presence of a condensing agent consisting essentially of an aqueous solution of boron trifluoride containing between about 10 and 60 percent by weight of $BF_3$ at a temperature productive of the condensation of aromatic hydrocarbons and formaldehyde to a useful resinous material, and separating said resinous material thus produced.

4. A process which comprises contacting formaldehyde and hydroformer bottoms with a catalyst consisting essentially of an aqueous solution of boron trifluoride containing between about 20 and 45 percent by weight of $BF_3$ at a temperature between about 60 and 130° C., and separating an organic chemical condensation product thus produced.

5. A process which comprises contacting formaldehyde and a hydrocarbon fraction boiling in the range of about 235 to 290° C. and containing a substantial proportion of dimethylnaphthalenes with a catalyst consisting essentially of an aqueous solution of boron trifluoride containing between about 20 and 45 percent by weight of $BF_3$ at a temperature between about 60 and 130° C., and separating a resinous condensation product thus produced.

6. A process which comprises contacting an aromatic hydrocarbon having at least one unsubstituted nuclear carbon atom and formaldehyde in a molar ratio of formaldehyde to aromatic hydrocarbon between about 0.5 and 5 with a catalyst consisting essentially of an aqueous solution of boron trifluoride containing between about 10 and 60 percent by weight of $BF_3$, the weight ratio of catalyst to aromatic hydrocarbon being between about 0.05 and 5, calculated as anhydrous $BF_3$, at a temperature between about 10 and 200° C. and under a pressure sufficient to maintain the liquid phase, and separating a resinous organic chemical condensation product thus produced.

7. A process which comprises contacting an aromatic hydrocarbon having at least one unsubstituted nuclear carbon atom and formaldehyde in a molar ratio of formaldehyde to aromatic hydrocarbon between about 1 and 2 with a catalyst consisting essentially of an aqueous solution of boron trifluoride containing between about 20 and 45 percent by weight of $BF_3$, the weight ratio of said catalyst to said aromatic hydrocarbon being between about 0.1 and 1, calculated as anhydrous $BF_3$ at a temperature between about 60 and 130° C. and autogenous pressure for a sufficient time to produce a resinous organic chemical condensation product, and separating the resinous product thus produced.

8. A process which comprises contacting an aromatic hydrocarbon having at least one unsubstituted nuclear carbon atom and aqueous formaldehyde with a catalyst consisting essentially of an aqueous solution of boron trifluoride containing between about 10 and 60 percent by weight of $BF_3$ at a temperature between about 10 and 200° C., whereby an organic phase and an aqueous phase are obtained, said organic phase containing a resinous chemical condensation product and said aqueous phase containing said catalyst in diluted form, separating said resinous product from said organic phase, distilling water from said aqueous phase to produce a $BF_3$ concentrate in the defined catalyst concentration range, and recycling the reconcentrated boron trifluoride solution for further condensation of aromatic hydrocarbon and formaldehyde.

References Cited in the file of this patent

UNITED STATES PATENTS

| | | |
|---|---|---|
| 2,382,184 | Thompson | Aug. 14, 1945 |
| 2,521,431 | Walsh | Sept. 5, 1950 |

OTHER REFERENCES

Evans et al.: J. of Polymer Science, vol. IV, 1949, pp. 359 to 362.